United States Patent
Hsu et al.

(10) Patent No.: US 8,305,363 B2
(45) Date of Patent: Nov. 6, 2012

(54) SENSING SYSTEM AND LOCATING METHOD THEREOF

(75) Inventors: Teng-Wei Hsu, Hsinchu (TW); Hsin-Chi Cheng, Hsinchu (TW)

(73) Assignee: Pixart Imaging, Hsinchu (TW)

( * ) Notice: Subject to any disclaimer, the term of this patent is extended or adjusted under 35 U.S.C. 154(b) by 470 days.

(21) Appl. No.: 12/703,256

(22) Filed: Feb. 10, 2010

(65) Prior Publication Data

US 2010/0141963 A1 Jun. 10, 2010

Related U.S. Application Data

(63) Continuation-in-part of application No. 12/249,222, filed on Oct. 10, 2008, now Pat. No. 7,689,381.

(30) Foreign Application Priority Data

Nov. 24, 2009 (TW) ................................ 98139946 A

(51) Int. Cl.
*G06F 3/042* (2006.01)

(52) U.S. Cl. ........ 345/175; 345/157; 345/173; 702/151; 178/18.09

(58) Field of Classification Search ................... 345/157, 345/158, 173, 175; 178/18.01, 18.09; 702/150, 702/151

See application file for complete search history.

(56) References Cited

U.S. PATENT DOCUMENTS

| | | | |
|---|---|---|---|
| 4,507,557 A | 3/1985 | Tsikos | |
| 4,782,328 A | 11/1988 | Denlinger | |
| 5,525,764 A * | 6/1996 | Junkins et al. | 178/18.01 |
| 6,036,189 A | 3/2000 | Gomez et al. | |
| 6,335,724 B1 * | 1/2002 | Takekawa et al. | 345/173 |
| 6,498,602 B1 * | 12/2002 | Ogawa | 345/173 |
| 6,803,906 B1 | 10/2004 | Morrison et al. | |
| 6,954,197 B2 | 10/2005 | Morrison et al. | |
| 7,109,978 B2 | 9/2006 | Gillespie et al. | |
| 7,232,986 B2 * | 6/2007 | Worthington et al. | 250/221 |
| 7,692,625 B2 | 4/2010 | Morrison et al. | |
| 7,755,026 B2 | 7/2010 | Pittel et al. | |
| 7,755,613 B2 | 7/2010 | Morrison et al. | |
| 7,907,124 B2 | 3/2011 | Hillis et al. | |
| 7,924,272 B2 | 4/2011 | Boer et al. | |
| 8,167,698 B2 * | 5/2012 | Van De Wijdeven et al. | 463/14 |
| 2005/0078095 A1 * | 4/2005 | Ung et al. | 345/175 |
| 2005/0128190 A1 * | 6/2005 | Ryynanen | 345/173 |
| 2005/0243070 A1 | 11/2005 | Ung et al. | |

(Continued)

FOREIGN PATENT DOCUMENTS

JP 1984211128 A 11/1984

(Continued)

*Primary Examiner* — Joe H Cheng
(74) *Attorney, Agent, or Firm* — Chun-Ming Shih

(57) ABSTRACT

A sensing system includes a frame having a first boundary, a second boundary, a third boundary and a fourth boundary and defining a sensing area therein, a light source module for providing light to the sensing area, a first image sensor, a second image sensor, a third image sensor and a mirror component. The first image sensor is disposed between two neighboring ends of the first and second boundaries. The second image sensor is disposed between two neighboring ends of the second and third boundaries. The third image sensor is disposed between two neighboring ends of the first and fourth boundaries. The mirror component is disposed at the fourth boundary. A locating method of the sensing system can determine a location of a pointer accurately and avoid a problem of a blind zone.

9 Claims, 4 Drawing Sheets

U.S. PATENT DOCUMENTS

| | | | |
|---|---|---|---|
| 2005/0248540 A1* | 11/2005 | Newton | 345/173 |
| 2007/0089915 A1* | 4/2007 | Ogawa et al. | 178/18.09 |
| 2009/0090569 A1 | 4/2009 | Lin | |
| 2010/0010773 A1 | 1/2010 | Lin et al. | |
| 2011/0095977 A1* | 4/2011 | Ung | 345/158 |

FOREIGN PATENT DOCUMENTS

| | | |
|---|---|---|
| JP | 20051025415 A | 1/2005 |
| TW | 098100969 | 1/2010 |
| WO | 2005034027 A1 | 4/2005 |

* cited by examiner

SENSING SYSTEM AND LOCATING METHOD THEREOF

CROSS-REFERENCE TO RELATED APPLICATIONS

This application is the continuation-in-part (CIP) of the U.S. application Ser. No. 12/249,222 filed on Oct. 10, 2008, now U.S. Pat. No. 7,689,381 B2, and claims the benefit of priority from the prior Taiwanese Patent Application No. 098139946, filed Nov. 24, 2009, the entire contents of which are incorporated herein by reference. U.S. application Ser. No. 12/422,191 filed on Apr. 10, 2009 is the continuation-in-part (CIP) of the U.S. application Ser. No. 12/249,222 filed on Oct. 10, 2008, and claims priority to Taiwan application No. 098100969; U.S. application Ser. No. 12/334,449 filed on Dec. 13, 2008, now abandoned, is the continuation-in-part (CIP) of the U.S. application Ser. No. 12/249,222 filed on Oct. 10, 2008, and claims priority to Taiwan application No. 097142355; U.S. application Ser. No. 12/550,681 filed on Aug. 31, 2009, now U.S. Pat. No. 8,131,502 B2, is the continuation-in-part (CIP) of the U.S. application Ser. No. 12/249,222 filed on Oct. 10, 2008, and claims priority to Taiwan application No. 098104392; U.S. application Ser. No. 12/632,808 filed on Dec. 8, 2009, now U.S. Pat. No. 8,135,561 B2, is the continuation-in-part (CIP) of the U.S. application Ser. No. 12/249,222 filed on Oct. 10, 2008, and claims priority to Taiwan application No. 09090987; U.S. application Ser. No. 12/557,451 filed on Sep. 10, 2009, is the continuation-in-part (CIP) of the U.S. application Ser. No. 12/422,191 filed on Apr. 10, 2009, which is the continuation-in-part (CIP) of the U.S. application Ser. No. 12/249,222 filed on Oct. 10, 2008, and claims priority to Taiwan application No. 098120274, and U.S. application Ser. No. 12/557,466 filed on Sep. 10, 2009 which claims priority to Taiwan application No. 098116457, are co-pending with this application.

BACKGROUND

1. Field of the Invention

The present invention relates to a sensing system, and particularly to a sensing system having a mirror component and a locating method thereof.

2. Description of the Related Art

Nowadays, a touch function has been one of necessary functions of many electronic devices. A touch system is an important component to achieve the touch function. Generally, a familiar type of the touch system is, for example, a resistive touch system, a capacitive touch system or an optical touch system. The electronic devices can be equipped with various touch systems in accordance with the various demands.

FIG. 1 is a schematic view of a conventional optical touch system. Referring to FIG. 1, the conventional optical touch system 100 includes a light guide module 110, a light source module 120 and a image sensor module 130. The light guide module 110 includes four light reflecting bars 112a, 112b, 112c and 112d arranged along four sides of a rectangle. The area in the rectangle defines a sensing area 114. The light source module 120 includes three light emitting components 122a, 122b and 122c. The light emitting component 122a is disposed between two neighboring ends of the light reflecting bar 112a and the light reflecting bar 112b, the light emitting component 122b is disposed between two neighboring ends of the light reflecting bar 112b and the light reflecting bar 112c, and the light emitting component 122c is disposed between two neighboring ends of the light reflecting bar 112a and the light reflecting bar 112d. The light source module 120 is configured for emitting light to the four light reflecting bars 112a, 112b, 112c and 112d. The four light reflecting bars 112a, 112b, 112c and 112d are configured for reflecting the light from the light source module 120 to irradiate the sensing area 114. The image sensor module 130 includes three image sensors 132a, 132b and 132c. The image sensor 132a is disposed two neighboring ends of the light reflecting bar 112a and the light reflecting bar 112b, the image sensor 132b is disposed two neighboring ends of the light reflecting bar 112b and the light reflecting bar 112c, and the image sensor 132c is disposed two neighboring ends of the light reflecting bar 112a and the light reflecting bar 112d.

The image sensor module 130 is configured for detecting a pointer (i.e., a light blocking object) in the sensing area 114, thereby calculating a location (i.e., coordinates) of the pointer in accordance with the information sensed by the image sensor module 130. For example, when two pointers are located in the sensing area 114, each of the image sensors 132a, 132b and 132c senses two dark points. In theory, the location of the pointer can be calculated using any two sensed dark points. However, in some cases, one of the image sensors 132a, 132b and 132c maybe sense only a dark point.

For example, when two pointers A and B are located in the sensing area 114, the image sensor 132a can sense two dark points A1 and B1, the image sensor 132b can sense two dark points A3 and B3, and the image sensor 132c can sense two dark points A3 and B3. The dark points A1, A2, and A3 are caused by the pointer A, and the dark points B1, B2, B3 are caused by the pointer B. However, because the dark point A1 is overlapped with the dark point B1, in fact, the image sensors 132a only senses one dark point. Thus, the locations of the dark points A1 and B1 calculated using a gravity center calculating method will generate an inaccuracy, thereby causing a deviation of the gravity center.

As above-mentioned, when the locations of the pointers A and B are calculated by using the dark points A1, B1, A2 and B2 sensed by the image sensors 132a and 132b, the location of one of the pointers A and B can be calculated by using a straight line L1 and a straight line L2, and the location of the other of the pointers A and B can be calculated by using the straight line L1 and a straight line L3. However, due to the deviation of the gravity center mentioned above, a large error between the calculated locations of the pointers A' and B' and the actual locations of the pointers A and B will generate. Similarly, when the locations of the pointers A and B are calculated by using the dark points A1, B1, A3 and B3 sensed by the image sensors 132a and 132c, the same problem is existed.

Additionally, when the locations of the pointers A and B are calculated by using the dark points A2, B2, A3 and B3 sensed by the image sensors 132b and 132c, the location of one of the pointers A and B can be calculated by using the straight line L2 and a straight line L5, and the location of the other the of pointers A and B can be calculated by using the straight line L3 and a straight line L4. However, because a slope of the straight line L2 is almost equal to that of the straight line L5, and a slope of the straight line L3 is almost equal to that of the straight line L4, a large error between the calculated locations of the pointers A" and B" and the actual locations of the pointers A and B will generate.

Moreover, the conventional optical touch system 100 has a blind zone. The blind zone refers to an area in the sensing area 114 where the dark point caused by the pointer can not be sensed by the image sensor 132b or the image sensor 132c of the image sensor module 130 and the location of the pointer can not be calculated. For example, as shown in FIG. 3, a sensing range of the image sensor 132a covers the light reflecting bars 112a and 112d. An interval for disposing the image sensor 132c exists between the light reflecting bar 112a and the light reflecting bar 112d. Because the image sensor 132c can not reflect the light, the image sensor 132b can not sense a pointer C in an area 150. Thus, the area 150 is the blind zone of the image sensor 132b. In addition, when a pointer D is located in the area 150 partially, the image sensor 132b can not sense a dark point caused by the pointer D accurately. Thus, a location of the pointer D can not be calculated accurately yet. It is noted that the image sensor 132c has the same problem.

BRIEF SUMMARY

The present invention provides a sensing system so as to determine a location of a pointer accurately and to eliminate a blind zone.

The present invention also provides a locating method of a sensing system so as to determine a location of a pointer accurately and to eliminate a blind zone.

To achieve the above-mentioned advantages, the present invention provides a sensing system including a frame, a light source module, a first image sensor, a second image sensor, a third image sensor and a mirror component. The frame includes a first boundary, a second boundary, a third boundary and a fourth boundary. The first boundary faces to the third boundary and the second boundary faces to the fourth boundary. The frame defines a sensing area therein. The light source module is configured for providing light to the sensing area. The first image sensor is disposed between two neighboring ends of the first boundary and the second boundary. A sensing range of the first image sensor covers the third boundary and the fourth boundary. The second image sensor is disposed between two neighboring ends of the second boundary and the third boundary. A sensing range of the second image sensor covers the first boundary and the fourth boundary. The third image sensor is disposed between two neighboring ends of the first boundary and the fourth boundary. A sensing range of the third image sensor covers the second boundary and the third boundary. The mirror component is disposed at the fourth boundary. The mirror component is configured for mirroring a pointer in the sensing area to form a mirror image. The first image sensor and the second image sensor are configured for sensing optical information of the pointer and the mirror image.

In one embodiment provided by the present invention, the light source module includes a first light emitting component, a second light emitting component and a third light emitting component. The first light emitting component is disposed between two neighboring ends of the first boundary and the second boundary. The second light emitting component is disposed between two neighboring ends of the second boundary and the third boundary. The third light emitting component is disposed between two neighboring ends of the first boundary and the fourth boundary.

In one embodiment provided by the present invention, the sensing system further includes a fist light guiding component, a second light guiding component and a third light guiding component. The first light guiding component is disposed at the first boundary, the second light guiding component is disposed at the second boundary and the third light guiding component is disposed at the third boundary.

In one embodiment provided by the present invention, each of the first light guiding component, the second light guiding component and the third light guiding component is a light reflecting bar, the first light emitting component, the second light emitting component and the third light emitting component emit light towards the sensing area, and the first light guiding component, the second light guiding component and the third light guiding component reflect the light arriving thereat to the sensing area.

In one embodiment provided by the present invention, each of the first light guiding component, the second light guiding component and the third light guiding component is a light guide bar and has a light emitting surface facing to the sensing area and a light incidence surface adjacent to the light emitting surface. The first light emitting component, the second light emitting component and the third light emitting component emit light to the light incidence surfaces of the first light guiding component, the second light guiding component and the third light guiding component respectively. The light emits from the light emitting surfaces of first light guiding component, the second light guiding component and the third light guiding component to the sensing area.

In one embodiment provided by the present invention, each of the first light emitting component, the second light emitting component and the third light emitting component is a light emitting diode.

In one embodiment provided by the present invention, each of the first image sensor, the second image sensor and the third image sensor includes a sensing unit and a processor electrically connected to the sensing unit.

In one embodiment provided by the present invention, the sensing system further includes a plate for disposing the frame, the light source module, the first image sensor, the second image sensor and the third image sensor thereon.

To achieve the above-mentioned advantages, the present invention provides a locating method of a sensing system. The locating method is suitable for being applied to the above-mentioned sensing system and includes following steps. A pointer in the sensing area is mirrored by the mirror component to form a mirror image of the pointer. Dark points caused by the pointer is sensed by the first image sensor, the second image sensor and the third image sensor respectively to obtain a first optical information, and dark points of the mirror image is sensed by the first image sensor and the second image sensor respectively to obtain a second optical information. A location of the pointer in the sensing area is determined according to the first optical information and the second optical information.

In the sensing system and the locating method thereof of the present invention, the mirror component is configured for mirroring the pointer to form the mirror image. Thus, the first image sensor and the second image sensor can sense more available optical information, thereby calculating the accurate location of the pointer and eliminating the blind zone.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
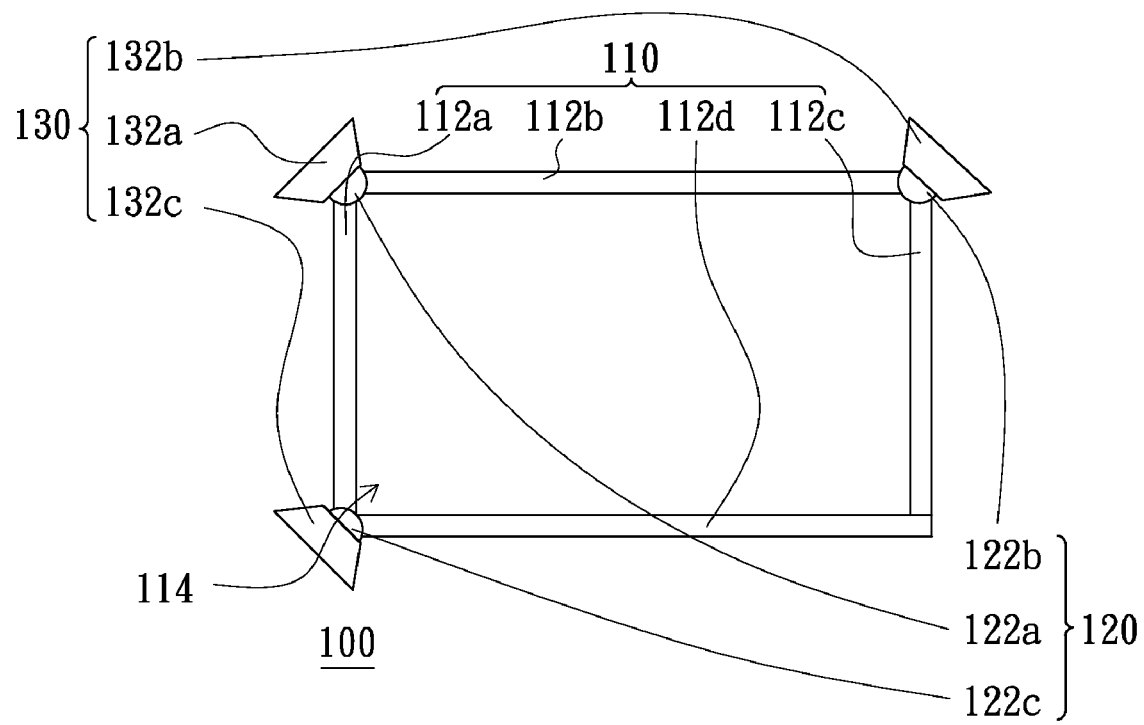
FIG. 1 is a schematic view of a conventional sensing system.
Figure 2:
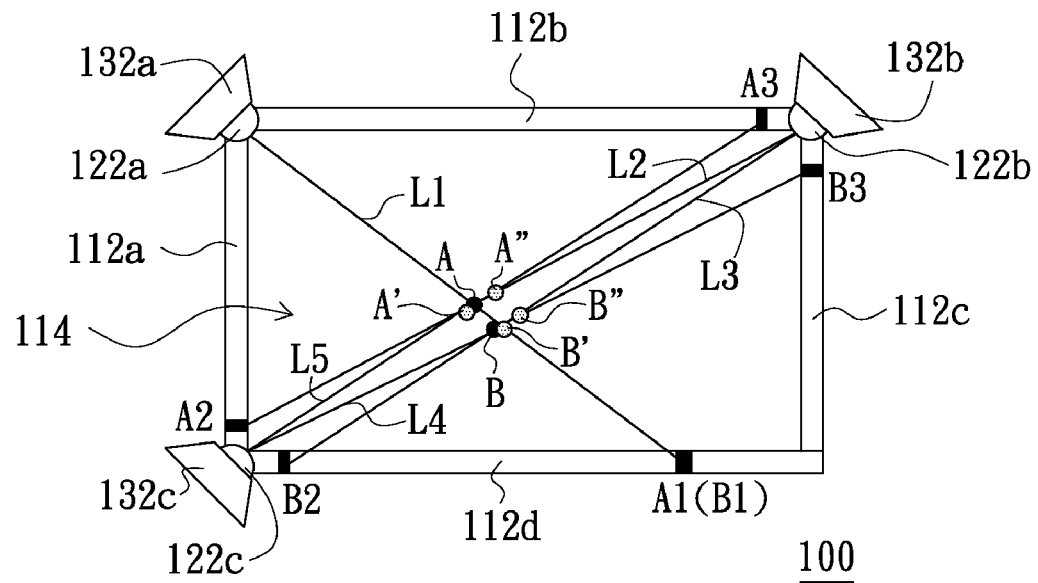
FIG. 2 is a schematic view of two overlapping dark points caused by two pointers in a sensing area of the sensing system shown in FIG. 1.
Figure 3:
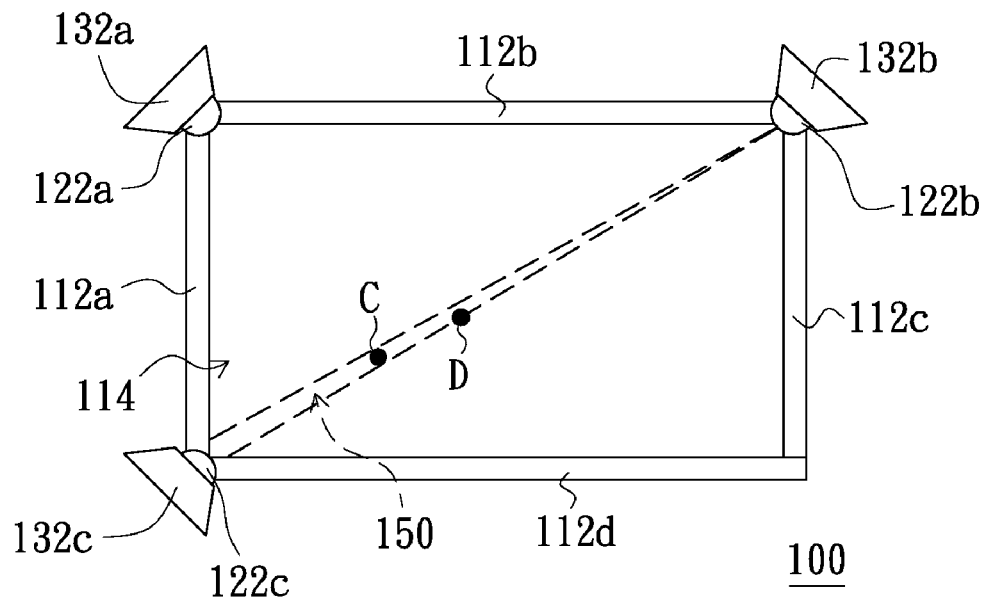
FIG. 3 is a schematic view of a blind zone of the sensing system shown in FIG. 1.
Figure 4:
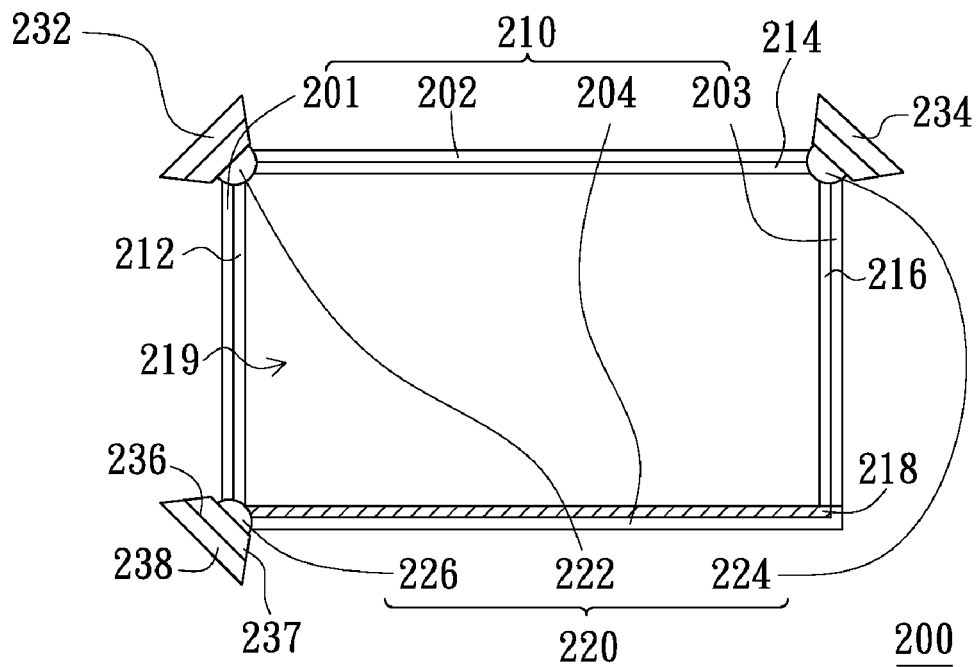
FIG. 4 is a schematic view of a sensing system in accordance with an embodiment of the present invention.

FIG. 4 is a schematic view of a sensing system in accordance with an embodiment of the present invention. Referring to FIG. 4, the sensing system 200 is, for example, an optical touch system. The sensing system 200 includes a frame 210, a light source module 220, a first image sensor 232, a second image sensor 234, a third image sensor 236 and a mirror component 218. In the present embodiment, the frame 210 is, for example, a rectangular frame. The frame 210 includes a first boundary 201, a second boundary 202, a third boundary 203 and a fourth boundary 204. The first boundary 201 faces to the third boundary 203 and the second boundary 202 faces to the fourth boundary 204. The frame 210 defines a sensing area 219 therein. In other words, the first boundary 201, the second boundary 202, the third boundary 203 and the fourth boundary 204 defines the sensing area 219 therebetween. The mirror component 218 is disposed at the fourth boundary 204 of the frame 210. The mirror component 218 is configured for mirroring a pointer in the sensing area 219 to form a mirror image of the pointer. The first image sensor 232, the second image sensor 234 and the third image sensor 236 are configured for sensing optical information of the pointer and the corresponding mirror image.

In the present embodiment, the sensing system 200 can further include a plate (not shown). The frame 210, the light source module 220, the first image sensor 232, the second image sensor 234 and the third image sensor 236 can be disposed on the plate.

Further, in the present embodiment, the sensing system 200 can includes a fist light guiding component 212, a second light guiding component 214 and a third light guiding component 216. The first light guiding component 212 is disposed at the first boundary 201, the second light guiding component 214 is disposed at the second boundary 202 and the third light guiding component 216 is disposed at the third boundary 203. Each of the first light guiding component 212, the second light guiding component 214 and the third light guiding component 216 is, for example, a light reflecting bar. The first light guiding component 212, the second light guiding component 214 and the third light guiding component 216 are configured for reflecting the light arriving thereat to the sensing area 219.

The light source module 220 includes a first light emitting component 222, a second light emitting component 224 and a third light emitting component 226. Each of the first light emitting component 222, the second light emitting component 224 and the third light emitting component 226 can be, but not limited to, a light emitting diode. In the present embodiment, the first light emitting component 222 is, for example, disposed between two neighboring ends of the first boundary 201 and the second boundary 202 of the frame 210 (i.e., between two neighboring ends of the first light guiding component 212 and the second light guiding component 214). The second light emitting component 224 is, for example, disposed between two neighboring ends of the second boundary 202 and the third boundary 203 of the frame 210 (i.e., between two neighboring ends of the second light guiding component 214 and the third light guiding component 216). The third light emitting component is, for example, disposed between two neighboring ends of the first boundary 201 and the fourth boundary 204 of the frame 210 (i.e., between two neighboring ends of the first light guiding component 212 and the mirror component 218). In the present embodiment, the first light emitting component 222, the second light emitting component 224 and the third light emitting component 226 emit light towards the sensing area 219.

The first image sensor 232 is disposed between two neighboring ends of the first boundary 201 and the second boundary 202 of the frame 210 (i.e., between two neighboring ends of the first light guiding component 212 and the second light guiding component 214). A sensing range of the first image sensor 232 covers the third boundary 203 and the fourth boundary 204 of the frame 210 (i.e., the third light guiding component 216 and the mirror component 218). The second image sensor 234 is disposed between two neighboring ends of the second boundary 202 and the third boundary 203 of the frame 210 (i.e., between two neighboring ends of the second light guiding component 214 and the third light guiding component 216). A sensing range of the second image sensor 234 covers the first boundary 201 and the fourth boundary 204 (i.e., the first light guiding component 212 and the mirror component 218). The third image sensor 236 is disposed between two neighboring ends of the first boundary 201 and the fourth boundary 204 of the frame 210 (i.e., between two neighboring ends of the first light guiding component 212 and the mirror component 218). A sensing range of the third image sensor 236 covers the second boundary 202 and the third boundary 203 (i.e., the second light guiding component 214 and the third light guiding component 216).

In detail, an opening is formed between two neighboring ends of the first boundary 201 and the second boundary 202 for disposing the first light emitting component 222 and the first image sensor 232. An opening is formed between two neighboring ends of the second boundary 202 and the third boundary 203 for disposing the second light emitting component 224 and the second image sensor 234. An opening is formed between two neighboring ends of the first boundary 201 and the fourth boundary 204 for disposing the third light emitting component 226 and the third image sensor 236.

Additionally, each of the first image sensor 232, the second image sensor 234 and the third image sensor 236 includes a sensing unit 237 and a processor 238 electrically connected to the sensing unit 237. A sensing range of the corresponding sensing unit 237 is the sensing range of the first image sensor 232, the second image sensor 234 or the third image sensor 236. The processor 238 is configured for processing a signal sensed by the sensing unit 237 and sending the processed signal to a central processing unit (not shown). Thus, the central processing unit can calculate the location of the pointer. The signal sensed by the sensing unit 237 can be a location of the dark point.

A locating method suitable for being applied to the sensing system 200 will be described in detail. With respect to the drawings, it is described how to avoid the inaccurate locations of the pointers due to overlapped dark points caused by a number of pointers.

The locating method suitable for being applied to the sensing system 200 includes the following steps.

A pointer in the sensing area 219 is mirrored by the mirror component 218 to form a mirror image of the pointer. Then, dark points caused by the pointer are sensed by the first image sensor 232, the second image sensor 234 and the third image sensor 236 respectively to obtain a first optical information, and dark points of the mirror image is sensed by the first image sensor 232 and the second image sensor 234 respectively to obtain a second optical information. Afterward, a location of the pointer in the sensing area 219 is determined according to the first optical information and the second optical information.

Figure 5:
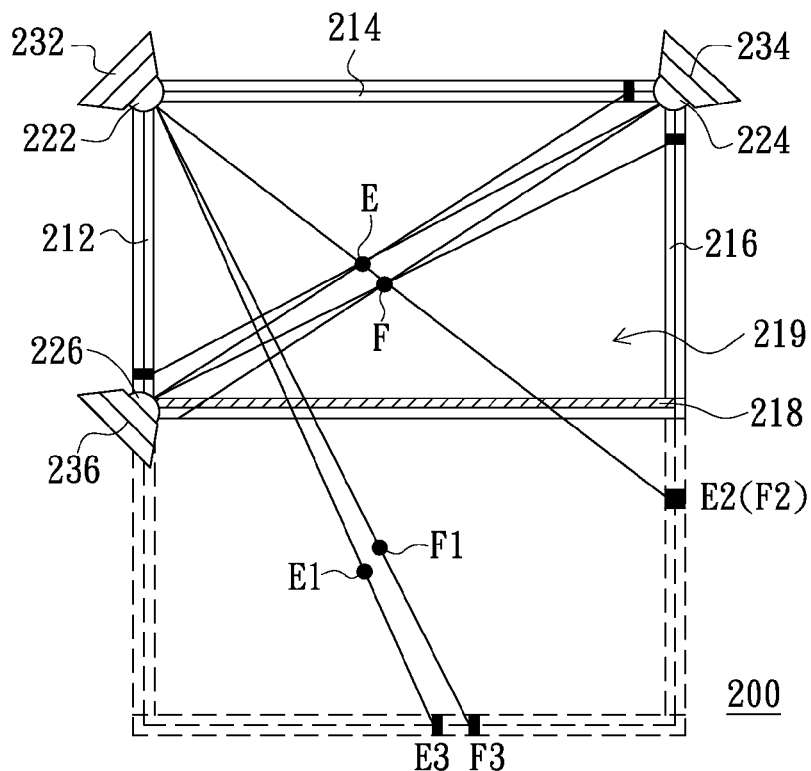
FIG. 5 is a schematic view of two overlapping dark points caused by two pointers in a sensing area of the sensing system shown in FIG. 4.

Referring to FIG. 5, in the present embodiment, for example, two pointers E and F are located in the sensing area 219 of the sensing system 200. The locating method of the sensing system 200 is described here. Two mirror images E1 and F1 of the two pointers E and F in the sensing area 219 are formed by the mirror component 218. Thus, dark points caused by the pointers E and F can be sensed by the first image sensor 232, the second image sensor 234 and the third image sensor 236 respectively, thereby obtaining a first optical information. Dark points of the mirror images E1 and F1 can be sensed by the first image sensor 232 and the second image sensor 234 respectively, thereby obtaining a second optical information. That is, the first optical information is about the pointers E and F and the second optical information is about the mirror images E1 and F1.

In the situation that one image sensor (e.g., the first image sensor 232) sense two dark points E2 and F2 caused by the two pointers E and F and two dark points E3 and F3 caused by the two mirror images E1 and F1. When the two dark points E2 and F2 are overlapped, the two dark points E3 and F3 are not overlapped. In other words, although the first image sensor 232 can not sense the available first optical information, the first image sensor 232 can sense the available second optical information. Therefore, the locations of the two pointers E and F can be calculated accurately by using the locations of the two dark points E3 and F3 (i.e., the second optical information) sensed by the first image sensor 232 and the locations of dark points caused by the two pointers E and F (i.e., the first optical information) sensed by the second image sensor 234 or the third image sensor 236.

Figure 6:
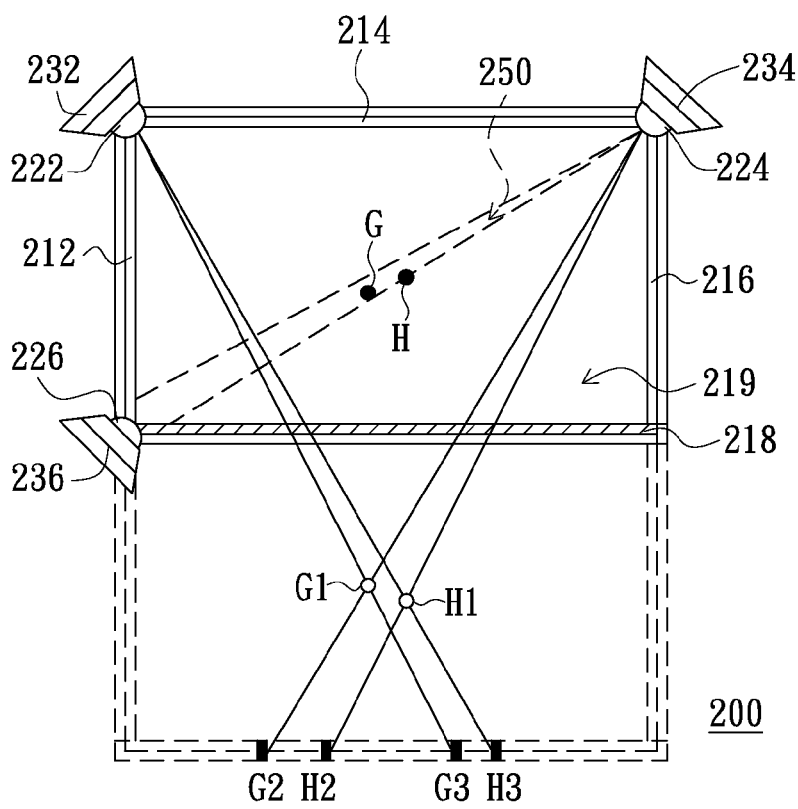
FIG. 6 is a schematic view of the sensing system shown in FIG. 4 that shows how to eliminate a blind zone.

Furthermore, the sensing system 200 can eliminate the blind zone in the conventional optical touch system 100 as aforesaid. Referring to FIG. 6, the second image sensor 234 is an example to describe how to eliminate the blind zone. Because a pointer G is located in the area 250 (i.e., a conventional blind zone), the second images sensor 234 can not sense a location of a dark point caused by the pointer G. In addition, because a pointer H is located in the area 250 partially, the second images sensor 234 can not sense a location of a dark point caused by the pointer H accurately. In other words, the second image sensor 234 can not sense the available first optical information. However, the pointers G and H can form two mirror images G1 and H1 due to the mirror component 218. Thus, the second image sensor 234 can sense two dark points G2 and H2 caused by the mirror images G1 and H1 and the first image sensor 232 can sense two dark points G3 and H3 caused by the mirror images G1 and H1. In other words, the first image sensor 232 and the second image sensor 234 both can sense the available second optical information. Therefore, the locations of the pointers G and H can be calculated accurately according to the locations of the two dark points G3 and H3 sensed by the first image sensor 232 and the locations of the two dark points G2 and H2 caused by the two pointers G and H and sensed by the second image sensor 234. Meanwhile, the locations of the pointers G and H can also be calculated accurately according to the locations of the two dark points G3 and H3 sensed by the first image sensor 232 and the locations of the dark points caused by the pointers G and H (i.e., the first optical information) and sensed by the first image sensor 232 or the third image sensor 236. Accordingly, the sensing system 200 and the locating method thereof in the present embodiment can eliminate the blind zone in the conventional sensing system as aforesaid.

Comparative to the conventional sensing system 100, the sensing system 200 in the present embodiment and the locating method thereof can determine the location of the pointer accurately. Because the mirror image of the pointer in the sensing area 219 can be formed by the mirror component 218, the first image sensor 232 and the second image sensor 234 can sense the dark points caused by the mirror image. Thus, the first image sensor 232 and the second image sensor 234 can obtain more available optical information than the image sensors in the conventional optical touch system 100, thereby calculating the accurate location of the pointer.

Figure 7:
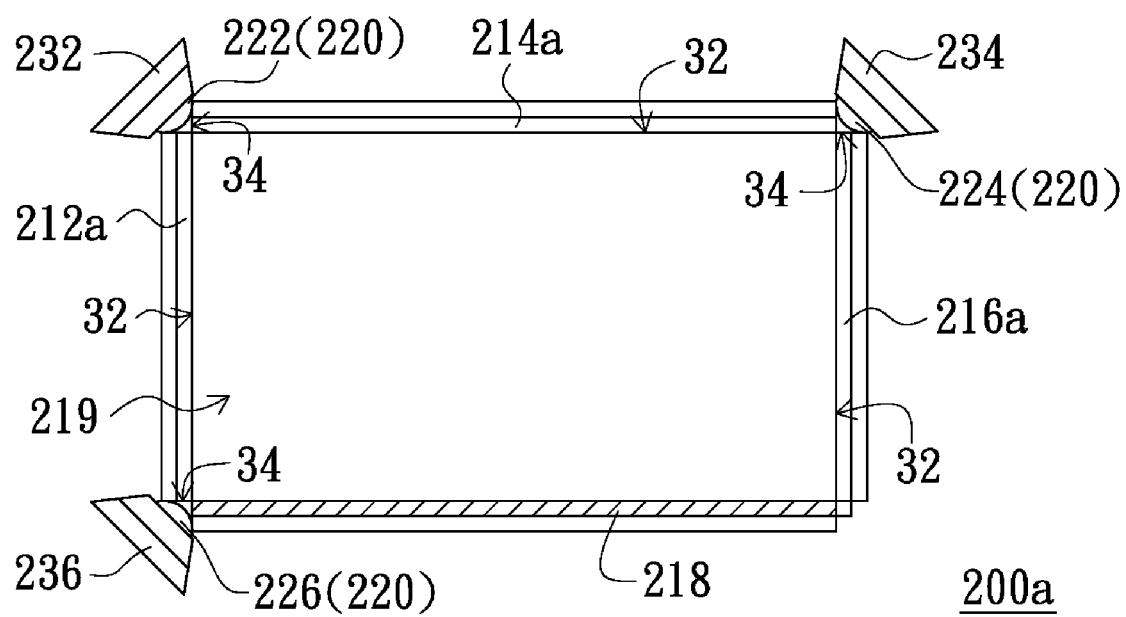
FIG. 7 is a schematic view of a sensing system in accordance with another embodiment of the present invention.

FIG. 7 is a schematic view of a sensing system in accordance with another embodiment of the present invention. Referring to FIG. 7, the sensing system 200a in the present embodiment is similar to the sensing system 200 except that each of a first light guiding component 212a, a second light guiding component 213a and a third light guiding component 214a is a light guide bar. In detail, each of the first light guiding component 212a, the second light guiding component 213a and the third light guiding component 214a has a light emitting surface 32 facing to the sensing area 219 and a light incidence surface 34 adjacent to the light emitting surface 32. In the present embodiment, a first light emitting component 222, a second light emitting component 224 and a third light emitting component 226 emit light toward the light incidence surfaces of the first light guiding component 212a, the second light guiding component 213a and the third light guiding component 214a respectively. The light from the light source 220 enters the first light guiding component 212a, the second light guiding component 213a and the third light guiding component 214a through the light incidence surfaces 34 of the first light guiding component 212a, the second light guiding component 213a and the third light guiding component 214a, and then emits out from the light emitting surfaces 32 of the first light guiding component 212a, the second light guiding component 213a and the third light guiding component 214a to irradiate the sensing area 219. The locating method and advantageous of the sensing system 200a are similar to that of the sensing system 200 as above-mentioned and is not described here.

In summary, in the sensing system and the locating method thereof, the mirror component is configured for mirroring the pointer to form the mirror image. Thus, the first image sensor and the second image sensor can obtain more available optical information about the mirror image, thereby calculating the accurate location of the pointer and eliminating the blind zone.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A sensing system, comprising:
   a frame comprising a first boundary, a second boundary, a third boundary and a fourth boundary, the first boundary facing to the third boundary, the second boundary facing to the fourth boundary, the frame defining a sensing area therein;
   a light source module configured for providing light to the sensing area;

a first image sensor disposed between two neighboring ends of the first boundary and the second boundary, a sensing range of the first image sensor covering the third boundary and the fourth boundary;

a second image sensor disposed between two neighboring ends of the second boundary and the third boundary, a sensing range of the second image sensor covering the first boundary and the fourth boundary;

a third image sensor disposed between two neighboring ends of the first boundary and the fourth boundary, a sensing range of the third image sensor covering the second boundary and the third boundary; and a mirror component disposed at the fourth boundary, wherein the mirror component is configured for forming a mirror image of a pointer in the sensing area, and the first image sensor and the second image sensor are configured for sensing optical information of the pointer and the mirror image.

2. The sensing system as claimed in claim 1, wherein the light source module comprises:

a first light emitting component disposed between two neighboring ends of the first boundary and the second boundary;

a second light emitting component disposed between two neighboring ends of the second boundary and the third boundary; and a third light emitting component disposed between two neighboring ends of the first boundary and the fourth boundary.

3. The sensing system as claimed in claim 2, further comprising:

a fist light guiding component disposed at the first boundary;

a second light guiding component disposed at the second boundary; and a third light guiding component disposed at the third boundary.

4. The sensing system as claimed in claim 3, wherein each of the first light guiding component, the second light guiding component and the third light guiding component is a light reflecting bar, the first light emitting component, the second light emitting component and the third light emitting component emit light towards the sensing area, and the first light guiding component, the second light guiding component and the third light guiding component reflect the light arriving thereat to the sensing area.

5. The sensing system as claimed in claim 3, wherein each of the first light guiding component, the second light guiding component and the third light guiding component is a light guide bar, and has a light emitting surface facing to the sensing area and a light incidence surface adjacent to the light emitting surface, the first light emitting component, the second light emitting component and the third light emitting component emit light to the light incidence surfaces of the first light guiding component, the second light guiding component and the third light guiding component respectively, and the light emits from the light emitting surfaces of first light guiding component, the second light guiding component and the third light guiding component to the sensing area.

6. The sensing system as claimed in claim 2, wherein each of the first light emitting component, the second light emitting component and the third light emitting component is a light emitting diode.

7. The sensing system as claimed in claim 1, wherein each of the first image sensor, the second image sensor and the third image sensor comprises a sensing unit and a processor electrically connected to the sensing unit.

8. The sensing system as claimed in claim 1, wherein further comprising a plate for disposing the frame, the light source module, the first image sensor, the second image sensor and the third image sensor thereon.

9. A locating method suitable for being applied to the sensing system claimed in claim 1, comprising:

using the mirror component to mirror a pointer in the sensing area to form a mirror image of the pointer;

sensing dark points caused the pointer by the first image sensor, the second image sensor and the third image sensor respectively to obtain a first optical information, sensing dark points of the mirror image by the first image sensor and the second image sensor respectively to obtain a second optical information; and determining a location of the pointer in the sensing area according to the first optical information and the second optical information.

* * * * *